Feb. 7, 1961 W. F. STREHLOW ET AL 2,970,482
VEHICLE POWER TRAIN OF THE QUICK SHIFT TYPE
Filed Feb. 25, 1958 3 Sheets-Sheet 1

Inventors
Walter F. Strehlow
Robert Carlin
by John P. Hines
Attorney

Inventors
Walter F. Strehlow
Robert Carlin
by John P Hines
Attorney

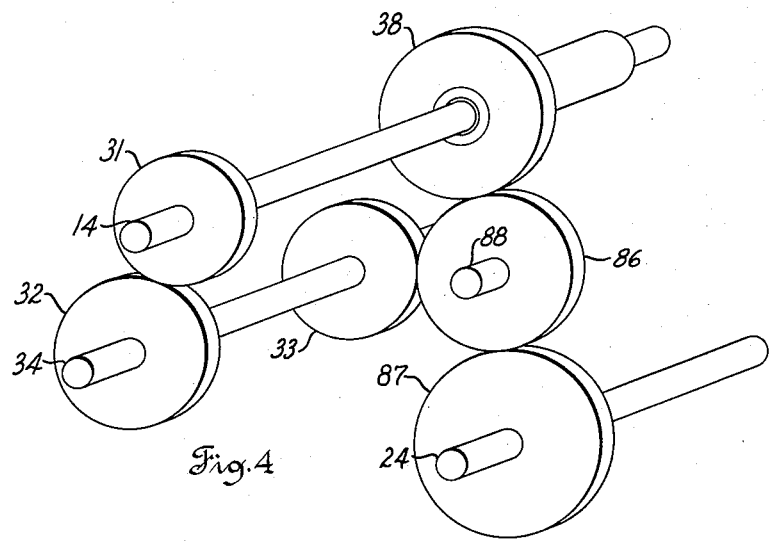
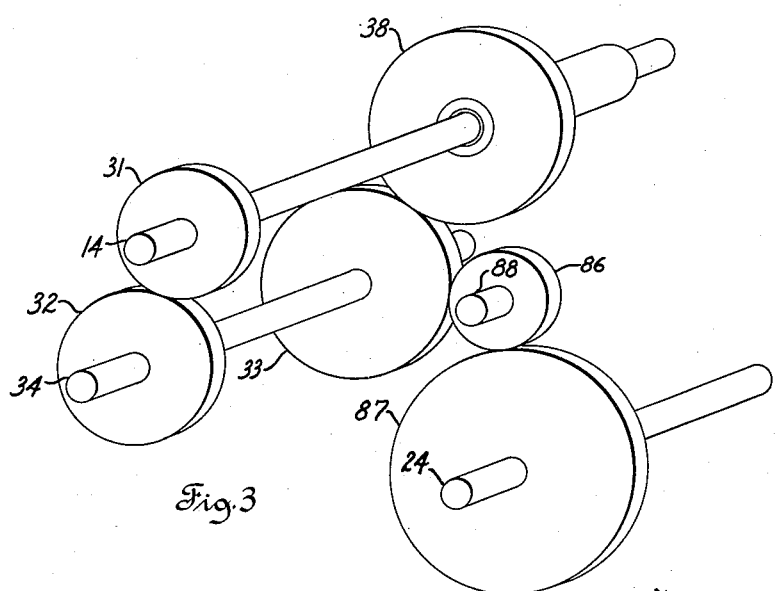

United States Patent Office
2,970,482
Patented Feb. 7, 1961

2,970,482

VEHICLE POWER TRAIN OF THE QUICK SHIFT TYPE

Walter F. Strehlow, Wauwatosa, and Robert Carlin, Greenfield, Wis., assignors to Allis-Chalmers Manufacturing Company, Milwaukee, Wis.

Filed Feb. 25, 1958, Ser. No. 717,461

4 Claims. (Cl. 74—15.84)

This invention relates generally to vehicle power trains and more particularly to a power train which can be shifted while the vehicle is in motion.

The invention is applicable to vehicles in general, however, one particular area of use of one modification is the farm tractor. Recently, farm tractors have been provided with an auxiliary transmission connected in series with the tractor main change speed transmission. The auxiliary transmission is provided with a means for quick shifting into a high or low speed range without the necessity of bringing the tractor to a complete stop previous to the shifting effort. This arrangement is particularly desirable in the case of farm tractors propelling a soil working tool. The field which is being worked is quite likely to have different soil conditions. A heavier soil may necessitate shifting to a lower speed which would result in an increased torque. Without a quick shift auxiliary transmission it would most likely be necessary to bring the vehicle to a complete stop before the main change speed transmission could be shifted without clashing the gears. If the main change speed transmission gears could be moved while the vehicle was under load in most cases the drag on the tractor would bring it to a complete stop before the shifting could be accomplished. If the main change speed transmission was put in a low range that would satisfy the torque requirements of the heavier soil conditions considerable time and fuel would be wasted while the vehicle was moving through the lighter soil conditions. On the other hand, considerable time would be lost if it were necessary to bring the vehicle to a complete stop before the shifting effort could be accomplished.

Applicants propose to provide an auxiliary transmission such as explained above which will allow the tractor to be shifted on the go. However, whereas the previously known auxiliary transmissions of the quick shift type consisted of planetary arrangements which are quite complex and expensive, applicants propose the use of an incomplex relatively inexpensive arrangement which utilizes much of the gearing already present in a vehicle power train.

One modification of the invention has particular application to industrial tractors. Industrial tractors and particularly fork trucks are continually moving forward and backward because of the close space conditions under which the trucks operate. With the clash type change speed transmission, the truck must be brought to a complete stop before the transmission can be shifted to change the direction of travel of the truck. Considerable time is lost each day because of this requirement. This requirement of stopping the truck to shift the transmission also has an adverse effect on the physical and mental attitude of the operator.

Applicants' invention overcomes the necessity of stopping the truck before the shifting effort can be accomplished. With applicants' power train, the auxiliary transmission can be shifted from a forward to a reverse drive before the truck is brought to a complete stop.

It is a general object of the invention to provide a vehicle power train with an auxiliary transmission which will allow the rotational motion delivered to the main change speed transmission to be changed while the vehicle is in motion.

It is a further object of the invention to provide a vehicle power train with a countershaft gear train in combination with a double friction clutch mechanism having control means to change the speed of the main change speed transmission while the vehicle is in motion.

Another object of the invention is to provide a vehicle power train with a countershaft gear train in combination with a double friction clutch mechanism so that the direction of rotational motion delivered to the main change speed transmission can be changed while the vehicle is in motion.

The foregoing and other objects and advantages of the invention will become more fully apparent from the following description of the invention shown in the accompanying drawings.

Referring to the drawings in which like reference characters designate the same or similar parts of the various views:

Fig. 3 is an oblique showing of the countershaft gear train arranged to provide two forward speeds; and Fig. 4 is an oblique showing of the countershaft gear train arranged to provide a forward and reverse drive.

Figure 1:
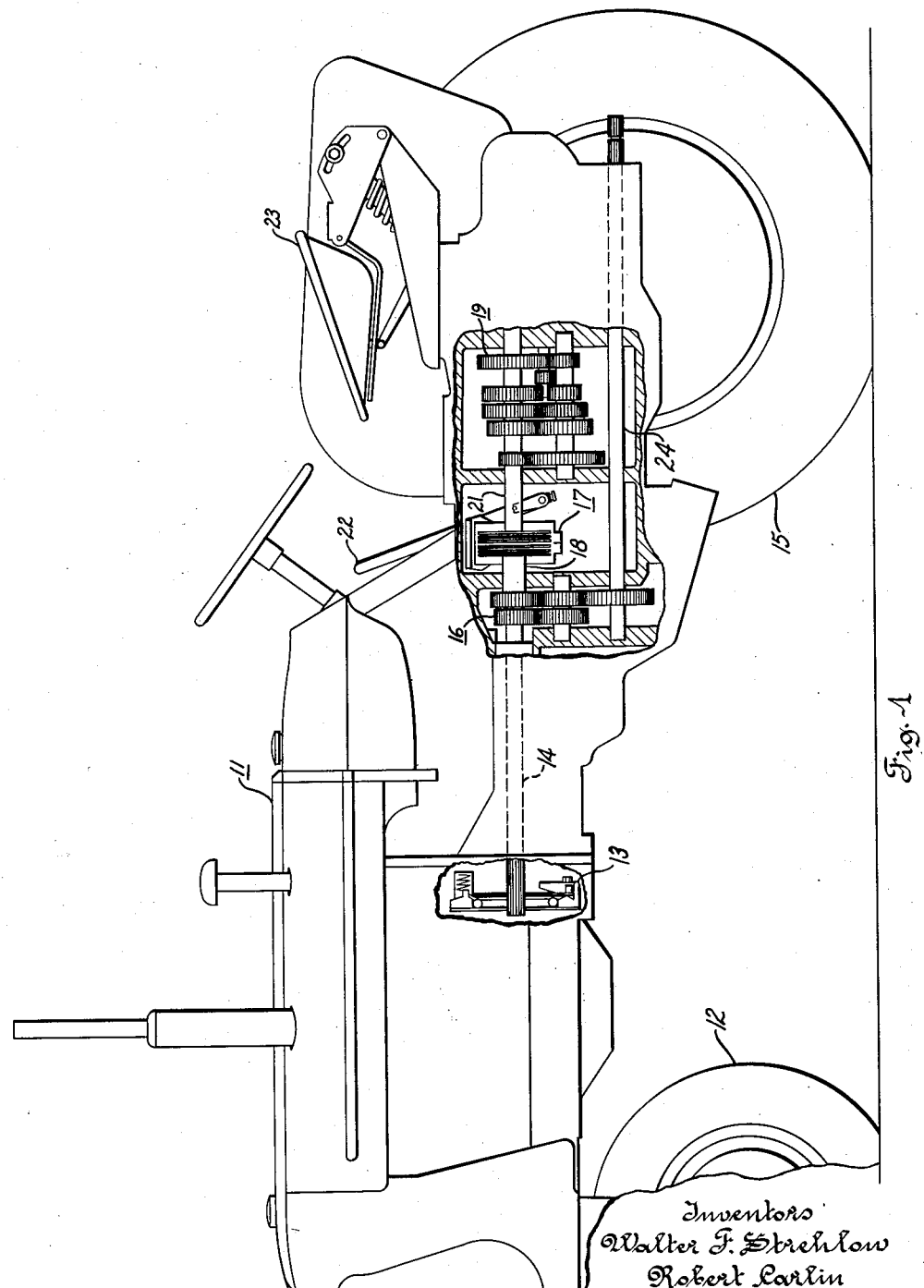
Fig. 1 is a side view of a tractor showing the invention as it would be applied to a vehicle power train.

Referring to Fig. 1, the vehicle generally designated 11 is supported at the front end by a conventional dirigible wheel structure 12. The rear end of the tractor is supported on a conventional traction wheel structure 15. The engine clutch 13 is of the usual type which is connected to the engine flywheel which is in turn driven by the vehicle engine or power source.

To the rear of the engine clutch and driven by the engine drive shaft or auxiliary transmission input shaft 14 is a countershaft gear train generally designated 16. The rear end of the engine drive shaft is connected to one side of a double disk type friction clutch mechanism generally designated 17. A quill shaft 18 surrounding the engine drive shaft 14 and driven at a lower speed than the drive shaft by the countershaft gear train is connected to the other side of the double friction clutch mechanism 17. The main change speed transmission generally indicated 19 has an input shaft 21 which is driven at one of two speeds by the clutch mechanism 17 and an output shaft connected to the traction wheel 15 through a differential (not shown) in any conventional manner. A control lever 22 for actuating the clutch mechanism is positioned adjacent to the vehicle operator's seat 23. A power take-off shaft 24 is driven through an idler gear by the countershaft gear train. It should be noted that the drive for the power take-off shaft is forward of the clutch mechanism 17. This insures rotation of the power take-off shaft as long as the engine clutch is engaged.

Figure 2:
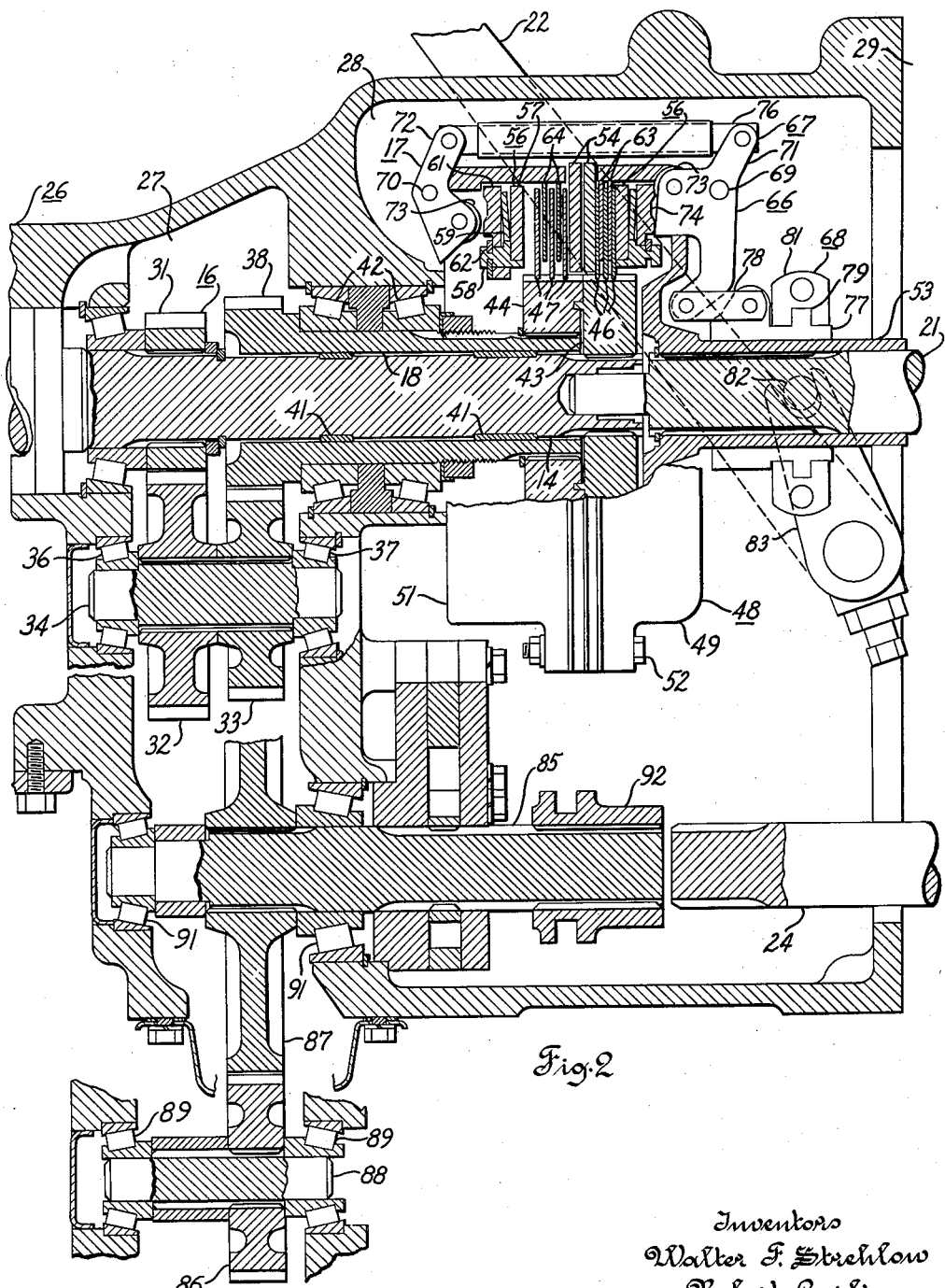
Fig. 2 is an enlarged fragmentary sectional view through the body of the vehicle of Fig. 1 showing parts of the invention.

Referring to Fig. 2, the right hand portion of the engine drive shaft 14 extends into the transmission housing generally designated 26 and is journaled on the left hand end of transmission input shaft 21. This housing is divided into a gear compartment 27, a clutch compartment 28 and a main transmission compartment 29. The countershaft gear train 16 is contained within the gear compartment 27. Gear 31 is spline connected to drive shaft 14 and drives gears 32 and 33. The latter two gears, 32 and 33, are connected for rotation with countershaft 34. The countershaft is journaled in the antifriction bearings 36 and 37 held in the walls of the gear compartment 27. Gear 33 constantly meshes with gear 38 which is preferably integral with the quill shaft 18. The sleeve or quill shaft 18 surrounds the engine drive shaft 14 and rotates at a speed less than the drive shaft because of the speed reduction derived from the countershaft gear train 16. The quill shaft is supported for rotation relative to the engine drive shaft by the antifriction bearings 42. The bushings 41 support the drive shaft 14 within the quill shaft 18.

The double disk type friction clutch mechanism 17 is rotatably contained within the clutch compartment 28 and includes a high range hub 43 and a low range hub 44. As shown in Fig. 2, hubs 43 and 44 are driving members which rotate simultaneously in the same direction but at different speeds. The low range hub 44 is spline connected to the right hand end of quill shaft 18 which rotates at a fraction of the speed of shaft 14 through the underdrive countershaft gear train 16. Hub 43 is splined to drive shaft 14 which rotates at engine speed. Rotation of both drive shaft 14 and quill shaft 18 is controlled by the engine clutch 13.

Friction disks 46 and friction disks 47 are axially slidably positioned on hubs 43 and 44, respectively. The disks are notched internally forming an internal ring of teeth which mate with the teeth of hubs 43 and 44. This arrangement allows the disks to be positioned on the gears in any axial position and also provides a positive drive for transmitting torque between the hubs and the disks.

Transmission input shaft or clutch output shaft 21 is journaled in drive shaft 14 and extends rearwardly to the main change speed transmission 19. Mounted on the forward end of the transmission input shaft 21 is a clutch drum 48 including front and rear carrier plates 49 and 51, respectively. These plates are rigidly fastened together by a series of cap screws 52. A shaft extension or auxiliary transmission output shaft 53 of the rear carrier plate 49 is connected to the transmission input shaft 21 in any conventional manner so that the clutch drum 48 rotates with the shaft 21.

Fastened between front and rear carrier plates 51 and 49 and rigidly held thereto by cap screws 52 are two identical backing plates 54 which extend radially inward from the periphery of the carrier plates. Spacing axially from the outer sides of backing plates 54 and slidably mounted in the front and rear carrier plates 51 and 49 are pressure plate assemblies 56. Since both of the assemblies are identical, only one will be described in detail. Pressure plate assembly 56 includes a pressure plate 57, a cylindrically shaped horizontally extending carrier 58 integrally joined with the pressure plate 57, a Belleville type spring washer 59, thrust plate 61 and a snap ring 62 positioned in a groove formed in the periphery of carrier ring 58 and axially spaced from pressure plate 57. The Belleville washer 59 is placed on carrier 58 and compressed against pressure plate 57 when thrust plate 61 is positioned on the carrier ring 58 on the inner side of snap ring 62.

The right hand portion or high range side of the clutch mechanism constitutes a first clutch which has two clutch disks 63 alternately positioned between friction disks 46. The left hand portion or low range side of the clutch mechanism constitutes a second clutch which has two clutch disks 64 alternately positioned between friction disks 47. These clutch disks 63 and 64 are connected to carrier plates 49 and 51, respectively, in any conventional manner for rotation therewith.

The friction disks 46 and 47 and the clutch disks 63 and 64 are in effect engageable elements having power transmitting frictional engaging surfaces. That is, the torque is transmitted through the friction surfaces of these disks. This allows the vehicle speed and torque to the drive wheels to be changed while the main engine clutch 13 is engaged and the vehicle is in motion.

An actuating means generally designated 66 comprises an overcenter lever arm assembly 67 and a clutch shiftable means 68. Pivot pins 69 and 70 are journaled on carrier plates 49 and 51, respectively, and support engaging levers 71 and 72, respectively. Cam follower rollers 73 are rotatably mounted on the inner ends of levers 71 and 72 for engagement with a cam face 74 formed on thrust plates 61. The levers 71 and 72 are interconnected by a third lever or push pull rod 76 which is pivotally connected between the upper ends of levers 71 and 72. With the levers 71 and 72 connected by the push pull rod 76, each side of the clutch mechanism is controlled in relation to the other side. The clutch mechanism is capable of alternate engagement of its first and second clutches and also capable of being placed in a neutral position.

Shaft extension 53 has slidably mounted thereon a sleeve 77. A downward extension of engaging lever 71 is connected by a pivot link 78 to the forward end of sleeve 77. An annular flange 79 formed on sleeve 77 fits into a groove formed in a collar 81. Trunnions 82 preferably integrally formed with the collar 81 are received by the bifurcated end of a control or shifter lever 83. Selective axial movement of sleeve 77 and alternate engagement of the clutch mechanism is provided by the hand control lever 22 which is preferably rigidly connected to the lower end of shifter lever 83. A more complete description of the clutch mechanism can be found in copending application S.N. 681,696.

In line with the general intent of inventing an incomplex and inexpensive power train, applicants utilize the countershaft gear train 16 for a double purpose. As was explained above, a gear reduction is accomplished through the countershaft gear train. Furthermore, the tractor power take-off shaft 24 is driven by this gear train. An idler gear 86 which is constantly in mesh with gear 33 is also continually driving gear 87 which is preferably spline connected to the splined shaft 85. The idler gear is carried on shaft 88 which is journaled in antifriction bearings 89 carried in the walls of the gear compartment 27 of the transmission housing 26. The gear 87 drives spline shaft 85 which is mounted on antifriction bearings 91. The right hand end of this shaft 85, as viewed in Fig. 2, has splines which mate with those on sliding coupling 92. For power take-off operation it is necessary to shift this coupling 92 to the right over the end of power take-off shaft 24. The position shown in Fig. 2 is for prolonged inactivity of power take-off use; for short intervals the power take-off drive is stopped by disengaging the main engine clutch 13.

In describing the operation of applicants' invention let us assume that the vehicle operator has put the main change speed transmission 19 in the third gear range. As shown in Fig. 2 with the engine running and the main engine clutch 13 engaged the high range side of the clutch mechanism is engaged and the main change speed transmission input shaft is driven at engine speed. With this arrangement, the drive is through the engine drive shaft 14 to the high range clutch hub and out through the carrier plate 49 to the transmission input shaft 21.

If the operator finds that the particular farming operation being accomplished requires an increase in torque it is only necessary for him to quickly move the hand lever 22 rearward or to the right, as viewed in Figs. 1 and 2. This movement actuates the overcenter actuating means 66 which disengages the high range side of the clutch mechanism and engages the low range side of the clutch mechanism. In this position the drive is from the engine drive shaft 14 through the countershaft gear train 16 through quill shaft 18 and clutch hub 44. The carrier plate 49 and transmission input shaft 21 are therefore driven at less than engine speed and in most instances the increased torque is sufficient to pull the tractor through the difficult soil condition.

With applicants' invention it is also possible to interrupt power to the traction means by placing the double friction clutch mechanism in a neutral position. In this manner the momentum of the vehicle can be stopped while the power take-off continues to rotate. By including this neutral position the operator can control the speed of the tractor and bring the tractor to a complete halt without using his feet. This allows the tractor to be controlled while the operator is in a standing position.

As was previously pointed out, being able to quick shift from a forward to a reverse drive without first bringing the vehicle to a complete stop is highly advantageous in the application of vehicles such as fork trucks. In keeping with the general intent of providing an incomplex versatile vehicle power train, one modification of applicants' invention allows this quick shifting forward and reverse feature. Referring to Fig. 4, the gearing which provided the high-low range drive (shown in Fig. 3) has been rearranged to provide a forward-reverse drive. Gear 31 is still spline connected to drive shaft 14 and is constantly in mesh with gear 32. Gear 32 and gear 33 rotate at the same speed on countershaft 34. Gear 33 is in mesh with idler gear 86. It is not also in mesh with transmission input gear 38 as it is in the double forward drive shown in Fig. 3. Transmission input gear 38 is in mesh with idler gear 86 and is therefore driven in a direction opposite to the direction of rotation of drive shaft 14. In both Figs. 3 and 4, the power take-off gear 87 is driven by the idler gear 86 in a direction opposite to the direction of rotation of the drive shaft.

With the gearing arranged as shown in Fig. 4, the power train shown in Fig. 2 will provide both a forward and a reverse drive to the transmission input shaft 21. The drive can be changed from a forward to a reverse direction of rotation because of the double friction clutch mechanism 17. It is elementary that the vehicle must come to a complete stop before a reverse in direction of movement can take place. With applicants' invention the potential direction of rotation of the main change speed transmission can be changed before the motion of the vehicle is stopped. If the clutch mechanism is shifted from a forward to a reverse engagement while the vehicle is moving, the disks will slip until the momentum of the vehicle has stopped. This slipping engagement acts as a brake and will bring the vehicle to a halt. Immediately after the vehicle comes to rest the direction of motion is changed.

It should be noted that the distances between the shafts 14, 34, 88 and 24 are the same in both the two speed forward and forward reverse drives. The bearing arrangement is identical and in both instances the power take-off shaft is being rotated in the same direction.

It will be apparent to those skilled in the art that various changes and modifications may be made in the embodiment of the invention illustrated and described herein without departing from the spirit of the invention or from the scope of the appended claims.

What is claimed is:

1. A vehicle power train comprising: a main engine clutch; a main change speed transmission; a first drive shaft connected to said main engine clutch for selective torque transmitting engagement therewith; a countershaft gear train connected in constant driven relation to said first drive shaft; a second drive shaft connected in constant driven relation to said gear train and revolving relative to said first drive shaft; first and second friction clutches selectively connecting said first and second drive shafts, respectively, in power transmitting relation to said main change speed transmission through elements having power transmitting frictional engaging surfaces; and means for selectively engaging said clutches while said engine clutch is engaged and said vehicle is in motion including a control member movable into a first position wherein said first clutch is engaged, a second position wherein said second clutch is engaged and a third position wherein said first and second clutches are disengaged.

2. A vehicle power train comprising: a main engine clutch; vehicle ground engaging drive wheels; a main change speed transmission and an auxiliary transmission each having a drive shaft and an output shaft, one of said transmissions' drive shaft being connected to said main engine clutch for selective torque transmitting engagement therewith, the other of said transmissions' output shaft being connected in torque transmitting engagement with said drive wheels, said one of said transmissions' output shaft being connected to said other of said transmissions' drive shaft, said auxiliary transmission including a countershaft gear train connected in constant driven relation to said auxiliary transmission drive shaft, a quill shaft connected in constant driven relation to said countershaft gear train and surrounding said auxiliary transmission drive shaft and rotating relative thereto, a double friction clutch mechanism including a first set of elements having power transmitting frictional engaging surfaces engageable to connect said quill shaft to said auxiliary transmission output shaft and a second set of elements having power transmitting frictional engaging surfaces engageable to connect said auxiliary transmission drive shaft to said auxiliary transmission output shaft, and means for selectively engaging said sets of elements while said engine clutch is engaged and said vehicle is in motion including a control member movable to a first position wherein said first set of elements are engaged and said second set of elements are disengaged and to a second position wherein said second set of elements are engaged and said first set of elements are disengaged and to a third position wherein said first and second sets of elements are disengaged.

3. A vehicle power train comprising: a main engine clutch; a main change speed transmission; a drive shaft connected to said clutch for selective rotational engagement therewith; a countershaft gear train connected in constant driven relation to said drive shaft; a quill shaft connected in constant driven relation to said gear train and surrounding said drive shaft, said quill shaft rotating relative to said drive shaft; a double friction clutch mechanism including a first set of elements having power transmitting frictional engaging surfaces engageable to connect one of said quill and drive shafts to said main change speed transmission and a second set of elements having power transmitting frictional engaging surfaces engageable to connect the other of said quill and drive shafts to said main change speed transmission; and means for selectively engaging said sets of elements while said engine clutch is engaged and said vehicle is in motion including a control member movable to a first position wherein said first set of elements is engaged and said second set of elements is disengaged, to a second position wherein said second set of elements is engaged and said first set of elements is disengaged and to a third position wherein said first and second sets of elements are disengaged.

4. A vehicle power train comprising: a main engine clutch; a main change speed transmission; a drive shaft connected to said engine clutch for selective rotational engagement therewith; a countershaft gear train connected in constant driven relation to said drive shaft; a quill shaft connected in constant driven relation to said gear train in surrounding relation to said drive shaft and rotating relative thereto; a power takeoff shaft connected in constant driven relation to said countershaft gear train; a double friction clutch mechanism including a first set of elements having power transmitting frictional engaging surfaces engageable to connect said quill shaft to said main change speed transmission and a second set of elements having power transmitting frictional engaging surfaces engageable to connect said drive shaft to said main change speed transmission; and means for selectively engaging said sets of elements while said engine clutch is engaged and said vehicle is in motion including a control member movable to a first position wherein said first set of elements are engaged and said second set of elements are disengaged, to a second position wherein said second set of elements are engaged and said first set of elements are disengaged and to a third position wherein said first and second sets of elements are disengaged.

References Cited in the file of this patent

UNITED STATES PATENTS

| | | |
|---|---|---|
| 2,046,428 | Riley | July 7, 1936 |
| 2,048,206 | Tyler | July 21, 1936 |
| 2,331,597 | Schmitter | Feb. 16, 1943 |
| 2,623,411 | Hendon | Dec. 30, 1952 |
| 2,756,600 | Kamluckin et al. | July 31, 1956 |
| 2,805,743 | Keese | Sept. 10, 1957 |

FOREIGN PATENTS

| | | |
|---|---|---|
| 178,812 | Austria | June 25, 1954 |